US010823071B2

(12) United States Patent
Merry et al.

(10) Patent No.: US 10,823,071 B2
(45) Date of Patent: *Nov. 3, 2020

(54) MULTI-SOURCE TURBINE COOLING AIR

(71) Applicant: Raytheon Technologies Corporation, Farmington, CT (US)

(72) Inventors: Brian D. Merry, Andover, CT (US); Gabriel L. Suciu, Glastonbury, CT (US); William K. Ackermann, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/158,581

(22) Filed: Oct. 12, 2018

(65) Prior Publication Data
US 2019/0107055 A1 Apr. 11, 2019

Related U.S. Application Data

(63) Continuation of application No. 14/964,984, filed on Dec. 10, 2015, now Pat. No. 10,371,056.

(51) Int. Cl.
| *F02C 7/18* | (2006.01) |
| *F01D 25/08* | (2006.01) |
| *F01D 5/02* | (2006.01) |
| *F01D 5/08* | (2006.01) |
| *F02C 6/08* | (2006.01) |
| *F02C 7/12* | (2006.01) |
| *F02C 7/36* | (2006.01) |
| *F02K 3/06* | (2006.01) |

(52) U.S. Cl.
CPC .............. *F02C 7/185* (2013.01); *F01D 5/022* (2013.01); *F01D 5/081* (2013.01); *F01D 25/08* (2013.01);
(Continued)

(58) Field of Classification Search
CPC .......... F01D 5/022; F01D 25/08; F02C 7/185; F02C 7/36; F02K 3/06; F05D 2220/32; F05D 2260/213
See application file for complete search history.

(56) References Cited

U.S. PATENT DOCUMENTS 4,967,552 A * 11/1990 Kumata .................... F01D 5/08
415/115
5,134,844 A * 8/1992 Lee ........................... F01D 5/08
415/116
(Continued)

FOREIGN PATENT DOCUMENTS

| DE | 19854907 A1 | 5/2000 |
| EP | 0608142 A1 | 7/1994 |
| FR | 2892148 A1 | 4/2007 |

OTHER PUBLICATIONS

European Search Report for European Application No. 16203026.6 dated Apr. 6, 2017.

Primary Examiner — Igor Kershteyn
(74) Attorney, Agent, or Firm — Carlson, Gaskey & Olds, P.C.

(57) ABSTRACT

A gas turbine engine comprises a compressor section and a turbine section, with the turbine section having a first stage blade row and a downstream blade row. A higher pressure tap is tapped from a higher pressure first location in the compressor. A lower pressure tap is tapped from a lower pressure location in the compressor which is at a lower pressure than the first location. The higher pressure tap passes through a heat exchanger, and then is delivered to cool the first stage blade row in the turbine section. The lower pressure tap is delivered to at least partially cool the downstream blade row.

17 Claims, 2 Drawing Sheets

(52) U.S. Cl.
CPC ............... *F02C 6/08* (2013.01); *F02C 7/12* (2013.01); *F02C 7/36* (2013.01); *F02K 3/06* (2013.01); *F05D 2220/32* (2013.01); *F05D 2260/213* (2013.01); *F05D 2260/40311* (2013.01); *Y02T 50/60* (2013.01)

(56) References Cited

U.S. PATENT DOCUMENTS

| | | | |
|---|---|---|---|
| 5,392,614 A * | 2/1995 | Coffinberry | F02C 7/12 60/806 |
| 5,581,996 A * | 12/1996 | Koch | F01D 5/141 60/266 |
| 5,586,860 A | 12/1996 | Bertrand et al. | |
| 7,677,048 B1 | 3/2010 | Brostmeyer et al. | |
| 8,495,883 B2 | 7/2013 | Foust et al. | |
| 8,951,014 B2 | 2/2015 | Corcoran et al. | |
| 9,151,164 B2 | 10/2015 | Tardif et al. | |
| 2009/0056342 A1 | 3/2009 | Kirzhner | |
| 2010/0251727 A1* | 10/2010 | Myers | F02C 9/20 60/773 |
| 2011/0135456 A1* | 6/2011 | Takahashi | F01D 11/24 415/180 |
| 2013/0283814 A1* | 10/2013 | Johns | F01D 25/14 60/782 |
| 2014/0311157 A1* | 10/2014 | Laurello | F02C 7/18 60/782 |
| 2015/0114002 A1 | 4/2015 | Schwarz et al. | |

* cited by examiner

MULTI-SOURCE TURBINE COOLING AIR

CROSS REFERENCE TO RELATED APPLICATION

This application is a continuation of U.S. patent application Ser. No. 14/964,984 filed Dec. 10, 2015.

BACKGROUND OF THE INVENTION

This application relates to arrangements for cooling a gas turbine engine turbine section utilizing multiple sources for the cooling air.

Gas turbine engines are known and typically include a fan delivering air into a bypass duct as propulsion air, and into a compressor as core airflow. The air is compressed in the compressor and delivered into a combustion section where it is mixed with fuel and ignited. Products of this combustion pass downstream over turbine rotors driving them to rotate. The turbine rotors, in turn, drive the fan and compressor rotors.

As can be appreciated, the turbine section experiences very high temperatures. Thus, it is known to provide cooling air from other locations in the gas turbine engine to cool the turbine section.

It is known to tap cooling air from a downstream location in the compressor section to the turbine sections. The downstream compressor air is hot itself. Thus, it is known to pass the cooling air through a heat exchanger on the way to cooling the turbine sections.

Particularly at upstream turbine rotor stages, this high pressure compressed air is able to provide adequate cooling.

SUMMARY OF THE INVENTION

In a featured embodiment, a gas turbine engine comprises a compressor section and a turbine section, with the turbine section having a first stage blade row and a downstream blade row. A higher pressure tap is tapped from a higher pressure first location in the compressor. A lower pressure tap is tapped from a lower pressure location in the compressor which is at a lower pressure than the first location. The higher pressure tap passes through a heat exchanger, and then is delivered to cool the first stage blade row in the turbine section. The lower pressure tap is delivered to at least partially cool the downstream blade row.

In another embodiment according to the previous embodiment, the higher pressure tap passes from the heat exchanger toward the turbine section, and is split into a first path heading radially outwardly to cool an upstream end of the first stage blade row, and a second path moving radially inwardly of a hub mounting the first stage blade row and then moves radially outwardly to cool a downstream end of the first stage blade row.

In another embodiment according to any of the previous embodiments, radially outwardly extending air from the higher pressure tap also cools a vane mounted intermediate the first stage blade row and the downstream blade row.

In another embodiment according to any of the previous embodiments, the radially outwardly extending air from the higher pressure tap also cools an upstream end of the downstream blade row.

In another embodiment according to any of the previous embodiments, the lower pressure tap passing radially inwardly of the first stage blade row, and axially beyond the downstream blade row and then radially outwardly to cool a downstream end of the downstream stage blade row.

In another embodiment according to any of the previous embodiments, the downstream stage blade row is a second stage, and the first stage blade row and the second stage rotate together as a single rotor.

In another embodiment according to any of the previous embodiments, a fan is positioned upstream of the compressor section and delivers air into a bypass duct as propulsion air, and into the compressor section with a bypass ratio defined as the volume ratio of air delivered into the bypass duct compared to the volume of air delivered into the compressor, with the bypass ratio being greater than or equal to about 6.0.

In another embodiment according to any of the previous embodiments, the bypass ratio is greater than or equal to about 10.0.

In another embodiment according to any of the previous embodiments, a fan drive turbine rotor is positioned downstream of a turbine rotor including the first stage blade row and the downstream blade row, with the fan drive turbine driving the fan through a gear reduction.

In another embodiment according to any of the previous embodiments, a gear ratio of the gear reduction is greater than or equal to about 2.3:1.

In another embodiment according to any of the previous embodiments, radially outwardly extending air from the higher pressure tap also cools a vane mounted intermediate the first stage blade row and the downstream blade row.

In another embodiment according to any of the previous embodiments, the radially outwardly extending air from the higher pressure tap also cools an upstream end of the downstream blade row.

In another embodiment according to any of the previous embodiments, the lower pressure tap passing radially inwardly of the first stage blade row, and axially beyond the downstream blade row and then radially outwardly to cool a downstream end of the downstream stage blade row.

In another embodiment according to any of the previous embodiments, the downstream stage blade row is a second stage, and the first stage blade row and the second stage rotate together as a single rotor.

In another embodiment according to any of the previous embodiments, the lower pressure tap passing radially inwardly of the first stage blade row, and axially beyond the downstream blade row and then radially outwardly to cool a downstream end of the downstream stage blade row.

In another embodiment according to any of the previous embodiments, the downstream stage blade row is a second stage, and the first stage blade row and the second stage rotate together as a single rotor.

In another embodiment according to any of the previous embodiments, a fan is positioned upstream of the compressor section and delivers air into a bypass duct as propulsion air, and into the compressor section with a bypass ratio defined as the volume ratio of air delivered into the bypass duct compared to the air delivered into the compressor, with the bypass ratio being greater than or equal to about 6.0.

In another embodiment according to any of the previous embodiments, a fan is positioned upstream of the compressor section and delivers air into a bypass duct as propulsion air, and into the compressor section with a bypass ratio defined as the volume ratio of air delivered into the bypass duct compared to the air delivered into the compressor, with the bypass ratio being greater than or equal to about 6.0.

In another embodiment according to any of the previous embodiments, the bypass ratio is greater than or equal to about 10.0.

In another embodiment according to any of the previous embodiments, a fan drive turbine rotor is positioned downstream of a turbine rotor including the first stage blade row and the downstream blade row, with the fan drive turbine driving the fan through a gear reduction.

These and other features may be best understood from the following drawings and specification.

DETAILED DESCRIPTION

Figure 1:
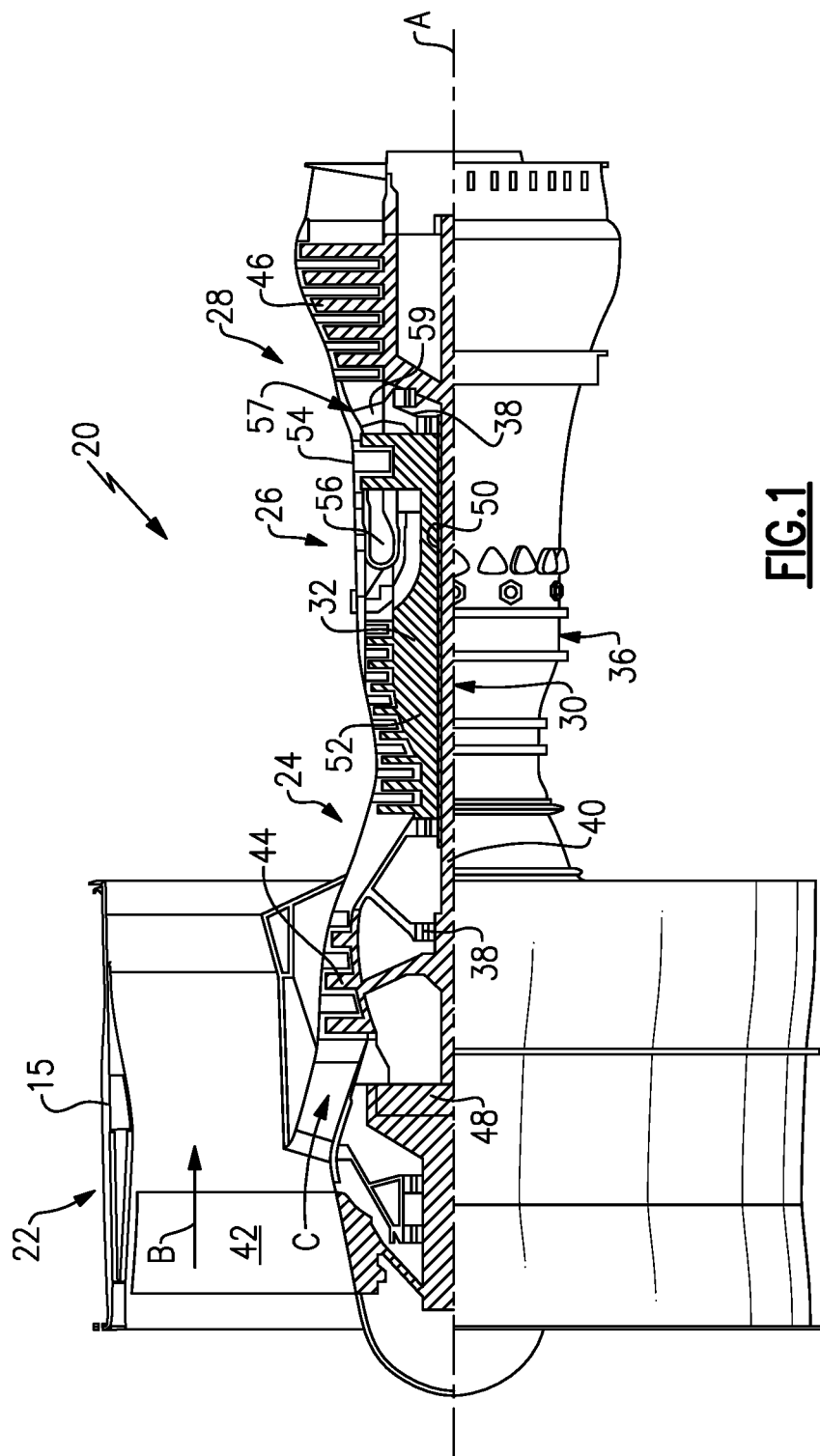
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
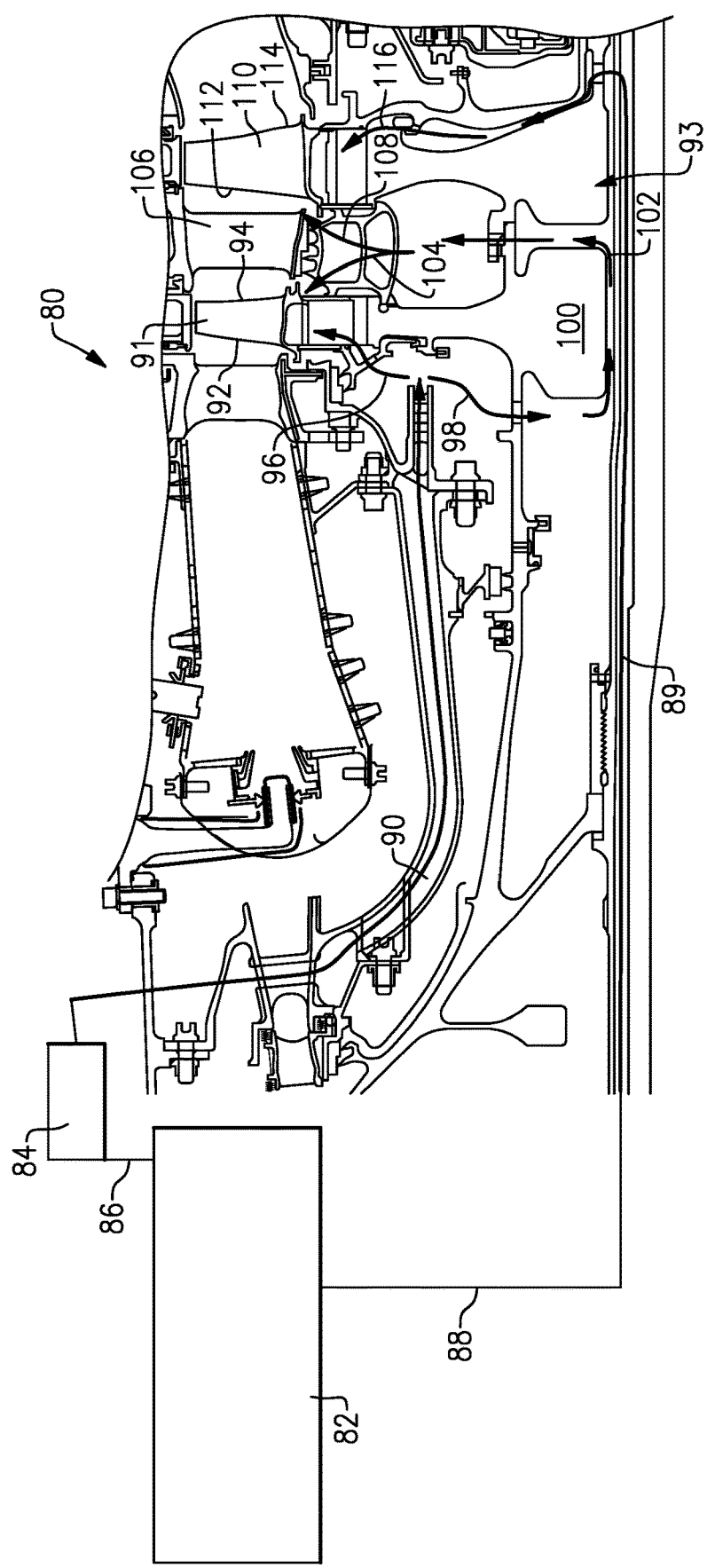
FIG. 2 shows an embodiment of a portion of a turbine section.

FIG. 2 shows a gas turbine engine 80 incorporating a multi-source cooling scheme for a turbine section 93. A compressor 82 is shown schematically. A heat exchanger 84 receives a tap 86 of high pressure compressor air. This may be tapped, as an example, from an exit of a high pressure compressor, such as in the engine 20 illustrated in FIG. 1. The air passes through the heat exchanger 84 and into a flow passage 90 heading toward a high pressure turbine section 93.

A second tap 88 is tapped from a lower pressure location in the compressor section 82. As an example, the tap 88 may be air at approximately 1100° F. (593° C.). Thus, a heat exchanger may not be necessary for this air. The air is tapped in a path 89 also toward the turbine section 93. Air 90 cools an upstream end 92 of first stage blade row 91 from a path 96. Another path 98 moves radially inward of a hub 100 of the first stage and then radially outwardly at 102 and splits at 104 to cool a downstream end 94 of the first blade row 91 and a vane 106. Another branch 108 from the path 102 cools the vane 106 and an upstream end 112 of a second blade row 110.

The cooling path 89 extends radially outwardly as shown at 116 to cool the downstream end 114 of the second stage blade row 110.

As should be understood, the air in path 90 is at a significantly higher pressure than air in path 89. This will facilitate cooling of the higher pressures seen by the first blade row 91, and even the upstream end 112 of the second blade row 110. However, the lower pressures in flow path 89 will be sufficient to move across the downstream end 114 of the second blade row 110, as products of combustion will be at a lower pressure than at the upstream end 112.

In this manner, the air from the tap 86, which has already received significantly more work than the air from the tap 88, is used more conservatively, thus, increasing the efficiency of the overall engine operation. Since path 90 is cooled, and path 89 is not, the two are close to the same temperature. This is beneficial to increase turbine disk life.

The gas turbine 80, as shown in FIG. 2, is particularly valuable when utilized with an engine as set forth in FIG. 1 wherein a fan drive turbine drives the fan rotor through a gear reduction. In such engines, the high ratio of air delivered into the bypass duct compared to the volume of air delivered into the compressor section makes efficient use of the air delivered into the compressor section very important. Thus, the cooling arrangement disclosed in this application becomes particularly valuable when utilized in such a gas turbine engine.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
    a compressor section and a turbine section, with said turbine section having a first stage blade row and a downstream blade row;
    a higher pressure tap tapped from a higher pressure first location in said compressor;
    a lower pressure tap tapped from a lower pressure location in said compressor which is at a lower pressure than said first location, said higher pressure tap passing through a heat exchanger, and then being delivered to cool said first stage blade row in said turbine section, and said lower pressure tap being delivered to at least partially cool said downstream blade row; and
    wherein said downstream stage blade row is a second stage, and said first stage blade row and said second stage rotating together as a single rotor.

2. The gas turbine engine as set forth in claim 1, wherein radially outwardly extending air from said higher pressure tap also cooling a vane mounted intermediate said first stage blade row and said downstream blade row.

3. The gas turbine engine as set forth in claim 2, wherein said radially outwardly extending air from said higher pressure tap also cooling an upstream end of said downstream blade row.

4. The gas turbine engine as set forth in claim 3, wherein said lower pressure tap passing radially inwardly of said first stage blade row, and axially beyond said downstream blade row and then radially outwardly to cool a downstream end of said downstream stage blade row.

5. The gas turbine engine as set forth in claim 4, wherein said downstream stage blade row is a second stage, and said first stage blade row and said second stage rotating together as a single rotor.

6. A gas turbine engine comprising:
    a compressor section and a turbine section, with said turbine section having a first stage blade row and a downstream blade row;
    a higher pressure tap tapped from a higher pressure first location in said compressor; and a lower pressure tap tapped from a lower pressure location in said compressor which is at a lower pressure than said first location, said higher pressure tap passing through a heat exchanger, and then being delivered to cool said first stage blade row in said turbine section, and said lower pressure tap being delivered to at least partially cool said downstream blade row;
    wherein a fan drive turbine rotor is positioned downstream of a turbine rotor including said first stage blade row and said downstream blade row, with said fan drive turbine driving said fan through a gear reduction;
    wherein a gear ratio of said gear reduction is greater than or equal to about 2.3:1.

7. The gas turbine engine as set forth in claim 1, wherein a fan is positioned upstream of said compressor section and said fan delivering air into a bypass duct as propulsion air, and into said compressor section with a bypass ratio defined as the volume ratio of air delivered into said bypass duct compared to the air delivered into said compressor, with said bypass ratio being greater than or equal to about 6.0.

8. The gas turbine engine as set forth in claim 7, wherein said bypass ratio is greater than or equal to about 10.0.

9. The gas turbine engine as set forth in claim 6, wherein said downstream stage blade row is a second stage, and said first stage blade row and said second stage rotating together as a single rotor.

10. The gas turbine engine as set forth in claim 1, wherein said lower pressure tap passing radially inwardly of said first stage blade row, and axially beyond said downstream blade row and then radially outwardly to cool a downstream end of said downstream stage blade row.

11. The gas turbine engine as set forth in claim 9, wherein a fan is positioned upstream of said compressor section and said fan delivering air into a bypass duct as propulsion air, and into said compressor section with a bypass ratio defined as the volume ratio of air delivered into said bypass duct compared to the air delivered into said compressor, with said bypass ratio being greater than or equal to about 6.0.

12. The gas turbine engine as set forth in claim 11, wherein said higher pressure tap passing from said heat exchanger toward said turbine section, and split into a first path heading radially outwardly to cool an upstream end of said first stage blade row, and a second path moving radially inwardly of a hub mounting said first stage blade row and then moving radially outwardly to cool a downstream end of said first stage blade row.

13. The gas turbine engine as set forth in claim 12, wherein radially outwardly extending air from said higher pressure tap also cooling a vane mounted intermediate said first stage blade row and said downstream blade row.

14. The gas turbine engine as set forth in claim 13, wherein said radially outwardly extending air from said higher pressure tap also cooling an upstream end of said downstream blade row.

15. The gas turbine engine as set forth in claim 14, wherein said lower pressure tap passing radially inwardly of said first stage blade row, and axially beyond said downstream blade row and then radially outwardly to cool a downstream end of said downstream stage blade row.

16. The gas turbine engine as set forth in claim 15, wherein a fan is positioned upstream of said compressor section and said fan delivering air into a bypass duct as propulsion air, and into said compressor section with a bypass ratio defined as the volume ratio of air delivered into said bypass duct compared to the volume of air delivered into said compressor, with said bypass ratio being greater than or equal to about 6.0.

17. The gas turbine engine as set forth in claim 9, wherein a fan drive turbine rotor is positioned downstream of a turbine rotor including said first stage blade row and said downstream blade row, with said fan drive turbine driving said fan through a gear reduction.

\* \* \* \* \*